US012397306B2

(12) United States Patent
Duncan

(10) Patent No.: US 12,397,306 B2
(45) Date of Patent: Aug. 26, 2025

(54) SPRAY GUN CONVERTER

(71) Applicant: 3M INNOVATIVE PROPERTIES COMPANY, St. Paul, MN (US)

(72) Inventor: Brian E. Duncan, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 372 days.

(21) Appl. No.: 17/914,710

(22) PCT Filed: Mar. 23, 2021

(86) PCT No.: PCT/IB2021/052396
§ 371 (c)(1),
(2) Date: Sep. 26, 2022

(87) PCT Pub. No.: WO2021/191791
PCT Pub. Date: Sep. 30, 2021

(65) Prior Publication Data

US 2023/0145062 A1 May 11, 2023

Related U.S. Application Data

(60) Provisional application No. 63/000,599, filed on Mar. 27, 2020.

(51) Int. Cl.
*B05B 7/24* (2006.01)

(52) U.S. Cl.
CPC .......... *B05B 7/2416* (2013.01); *B05B 7/2408* (2013.01); *B05B 7/2429* (2013.01); *B05B 7/2478* (2013.01)

(58) Field of Classification Search
CPC ... B05B 7/2416; B05B 7/2408; B05B 7/2429; B05B 7/2478
(Continued)

(56) References Cited

U.S. PATENT DOCUMENTS 2,626,122 A 1/1953 Lammiman
2,708,095 A 5/1955 Mitchell
(Continued)

FOREIGN PATENT DOCUMENTS

EP 3351309 B1 4/2021
EP 3827902 B1 8/2022
(Continued)

OTHER PUBLICATIONS

International Search Report for PCT International Application No. PCT/IB2021/052396, mailed on Jun. 17, 2021, 5 pages.

*Primary Examiner* — Chee-Chong Lee

(57) ABSTRACT

Various embodiments of a spray gun converter (100) and a spray gun system that includes such converter (100) are disclosed. The spray gun converter (100) includes a body (102) having a first end (104) configured for insertion into an air passage of a spray gun (11), a second end (106) having a converter fitting (108) configured for connection to a reservoir (30), and a reservoir air passage (110) extending through the body (102) from an inlet end (112) at the first end to an outlet end (114) on the converter fitting (108) at the second end. The spray gun converter (100) also includes a reservoir air control valve (116) that opens and closes the reservoir air passage (110).

21 Claims, 11 Drawing Sheets

(58) Field of Classification Search
USPC ........................................................ 239/533.1
See application file for complete search history.

(56) References Cited

U.S. PATENT DOCUMENTS

| | | | | |
|---|---|---|---|---|
| 2,886,252 | A | 5/1959 | Ehrensperger | |
| 6,536,687 | B1 | 3/2003 | Navis et al. | |
| 6,953,155 | B2 | 10/2005 | Joseph et al. | |
| 7,032,839 | B2 | 4/2006 | Blette et al. | |
| 7,201,336 | B2 | 4/2007 | Blette et al. | |
| 7,410,106 | B2 | 8/2008 | Escoto, Jr. et al. | |
| 8,297,536 | B2 * | 10/2012 | Ruda | B05B 7/2478 220/375 |
| 8,313,047 | B2 * | 11/2012 | Micheli | B05B 15/62 239/587.6 |
| 8,360,345 | B2 * | 1/2013 | Micheli | B05B 9/01 251/231 |
| 8,500,043 | B2 * | 8/2013 | Heigl | B05B 7/2405 239/600 |
| 8,590,809 | B2 * | 11/2013 | Escoto, Jr. | B05B 12/002 239/290 |
| 8,684,281 | B2 * | 4/2014 | Micheli | B05B 7/0815 239/599 |
| 9,802,213 | B2 * | 10/2017 | Joseph | B05B 7/2432 |
| 2021/0162438 | A1 | 6/2021 | Zaki et al. | |

FOREIGN PATENT DOCUMENTS

| | | | |
|---|---|---|---|
| GB | 2233426 | A | 1/1991 |
| WO | 2013134182 | A1 | 9/2013 |
| WO | 2018104826 | A1 | 6/2018 |
| WO | 2018104870 | A1 | 6/2018 |
| WO | 2018104871 | A1 | 6/2018 |
| WO | 2018109624 | A1 | 6/2018 |
| WO | 2018109625 | A1 | 6/2018 |

* cited by examiner

SPRAY GUN CONVERTER

CROSS REFERENCE TO RELATED APPLICATIONS

This application is a national stage filing under 35 U.S.C. 371 of PCT/IB2021/052396, filed Mar. 23, 2021, which claims the benefit of U.S. Application No. 63/000,599, filed Mar. 27, 2020, the disclosure of which is incorporated by reference in its/their entirety herein.

FIELD OF INVENTION

The present invention relates to devices and methods for converting a standard gravity-fed spray gun to a pressure-assisted, gravity-fed spray gun. Spray guns are used in a variety of industries to apply liquid coatings to substrates.

BACKGROUND

Spray guns are used, for example, in vehicle repair body shops to apply liquid coating media such as primer, paint and/or clearcoat to vehicle parts. Typically, the spray gun is made of solid metal or plastic and includes a platform and spray head assembly. The spray head assembly includes a nozzle for dispensing the liquid, a center air outlet that provides air to atomize the liquid as it exits the nozzle, and a fan air outlet that provides air to shape the atomized liquid into the desired spray pattern. The spray gun contains a series of internal passages that distribute air from an air supply manifold in the platform to the center air outlet and fan air outlet in the spray head assembly.

Liquid is typically gravity fed to the spray gun by a reservoir that is in fluid contact with the spray head assembly. However, if the liquid becomes too viscous, the spray gun cannot operate as intended, thus preventing delivery of the liquid from the nozzle. In such cases, a pressure-assisted, gravity-fed spray gun (also referred to herein as a "pressure-assisted spray gun") may be used to provide pressurized air to the reservoir to facilitate fluid flow to the spray gun nozzle.

Traditionally, gravity-fed and pressure-assisted applications required different spray guns. Attempts to provide a single spray gun for both applications have met with limited success. For example, a gravity-fed spray gun has been converted to a pressure-assisted spray gun by adding a secondary regulator below the handle of the spray gun to divert a portion of the air supply to the reservoir. However, the regulator adds bulk to the spray gun, making it less adaptable for applications in tight spaces. In another example, a pressure barb or bolt can be inserted over the air inlet of a pressure-assisted reservoir, thereby causing a pressure-assisted spray gun to perform like a gravity-fed spray gun.

SUMMARY

The present disclosure describes various embodiments of a spray gun converter that can convert a gravity-fed spray gun to a pressure-assisted spray gun by diverting a portion of the air supply to a liquid containing reservoir for pressure-assisted liquid delivery. The spray gun converter can be inserted into a manifold of a platform of the gravity-fed spray gun that feeds air to a nozzle center air outlet and a nozzle fan air outlet of a spray head assembly that is connected to the platform. In at least one embodiment, the spray gun converter is not inserted into the air supply line to the gun (or a separate assembly adjacent to the spray gun body such as a regulator) but rather in the gun body itself. The converter adds little to no additional bulk to the spray gun since the majority of the converter resides in the platform of the spray gun and, in some cases, replaces a fan control air regulator. Additionally, by placing the converter in the manifold of the platform, the diversion of air to the reservoir has little to no effect on air flow through the nozzle center air and nozzle fan air outlets of the spray head assembly. The spray gun converter allows the user to adjust the amount of air that is diverted to the reservoir and can be turned completely off so that the spray gun operates solely in gravity-feed mode with the converter present. Additionally, or alternatively, the spray gun converter is reversibly attached to the spray gun platform so that it can be quickly and easily inserted or removed, depending upon the desired application.

In one embodiment, the present disclosure provides a spray gun converter that includes a body. The body includes a first end configured for insertion into an air passage of a gravity-fed spray gun, a second end having a converter fitting configured for connection to a reservoir, and a reservoir air passage extending through the body from an inlet end at the first end to an outlet end on the converter fitting at the second end. The spray gun converter also includes a reservoir air control valve that opens and closes the reservoir air passage.

In another embodiment, the present disclosure provides a spray gun that includes a platform having a manifold. The manifold includes a chamber, a manifold air inlet fluidly connected to the chamber, and a manifold center air outlet and a manifold fan air outlet each fluidly connected to the chamber. The manifold further includes an access fluidly connected to the chamber. The spray gun also includes a spray head assembly connected to the platform. The spray head assembly includes a nozzle fluid passage having a nozzle fluid inlet and a nozzle fluid outlet, a nozzle center air passage having a nozzle center air inlet and a nozzle center air outlet, and a nozzle fan air passage having a nozzle fan air inlet and a nozzle fan air outlet. The nozzle center air inlet is fluidly connected to the manifold center air outlet, and the nozzle fan air inlet is fluidly connected to the manifold fan air outlet. The spray gun further includes a spray gun converter that has a body that includes a first end configured for insertion into the access of the manifold of the platform, and a second end having a converter fitting configured for connection to a reservoir. The converter further includes a reservoir air passage extending through the body from an inlet end at the first end to an outlet end on the converter fitting at the second end, where the reservoir air passage is configured for fluid connection to the chamber of the manifold of the platform. The spray gun converter also includes a reservoir air control valve that opens and closes the reservoir air passage.

In a further embodiment, the present disclosure provides a spray gun system that includes a platform having a manifold. The manifold includes a chamber, a manifold air inlet fluidly connected to the chamber, and a manifold center air outlet and a manifold fan air outlet each fluidly connected to the chamber. The manifold further includes an access fluidly connected to the chamber. The spray gun also includes a spray head assembly connected to the platform. The spray head assembly includes a nozzle fluid passage having a nozzle fluid inlet and a nozzle fluid outlet, a nozzle center air passage having a nozzle center air inlet and a nozzle center air outlet, and a nozzle fan air passage having a nozzle fan air inlet and a nozzle fan air outlet. The nozzle center air inlet is fluidly connected to the manifold center air outlet, and the nozzle fan air inlet is fluidly connected to the manifold fan air outlet. The spray gun further includes a spray gun converter that has a body that includes a first end configured for insertion into the access of the manifold of the platform, and a second end having a converter fitting. The converter further includes a reservoir air passage extending through the body from an inlet end at the first end to an outlet end on the converter fitting at the second end, where the reservoir air passage is configured for fluid connection to the chamber of the manifold of the platform. The spray gun converter also includes a reservoir air control valve that opens and closes the reservoir air passage. The spray gun system also includes a reservoir having a reservoir fitting and a fluid outlet that supplies fluid to the nozzle fluid inlet in the spray head assembly, and a reservoir connector attached at one end to the reservoir fitting of the reservoir and at the opposite end to the converter fitting of the spray gun converter.

In a further embodiment, the present disclosure provides a method for converting a gravity-fed spray gun to a pressure-assisted spray gun. The method includes inserting a spray gun converter into a manifold of the gravity-fed spray gun. The spray gun converter includes a body having a first end configured for insertion into the manifold of the gravity-fed spray gun, a second end having a converter fitting configured for connection to a reservoir, and a reservoir air passage extending through the body from an inlet end at the first end to an outlet end on the converter fitting at the second end. The spray gun converter also includes a reservoir air control valve that opens and closes the reservoir air passage. The method further includes fluidly connecting the converter fitting to the reservoir, and adjusting the reservoir air control valve so that the reservoir air passage is at least partially open.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for illustration. The terms "a," "an," and "the" are used interchangeably with the phrases "at least one" and "one or more."

The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "some embodiments" means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments.

Figure 1:
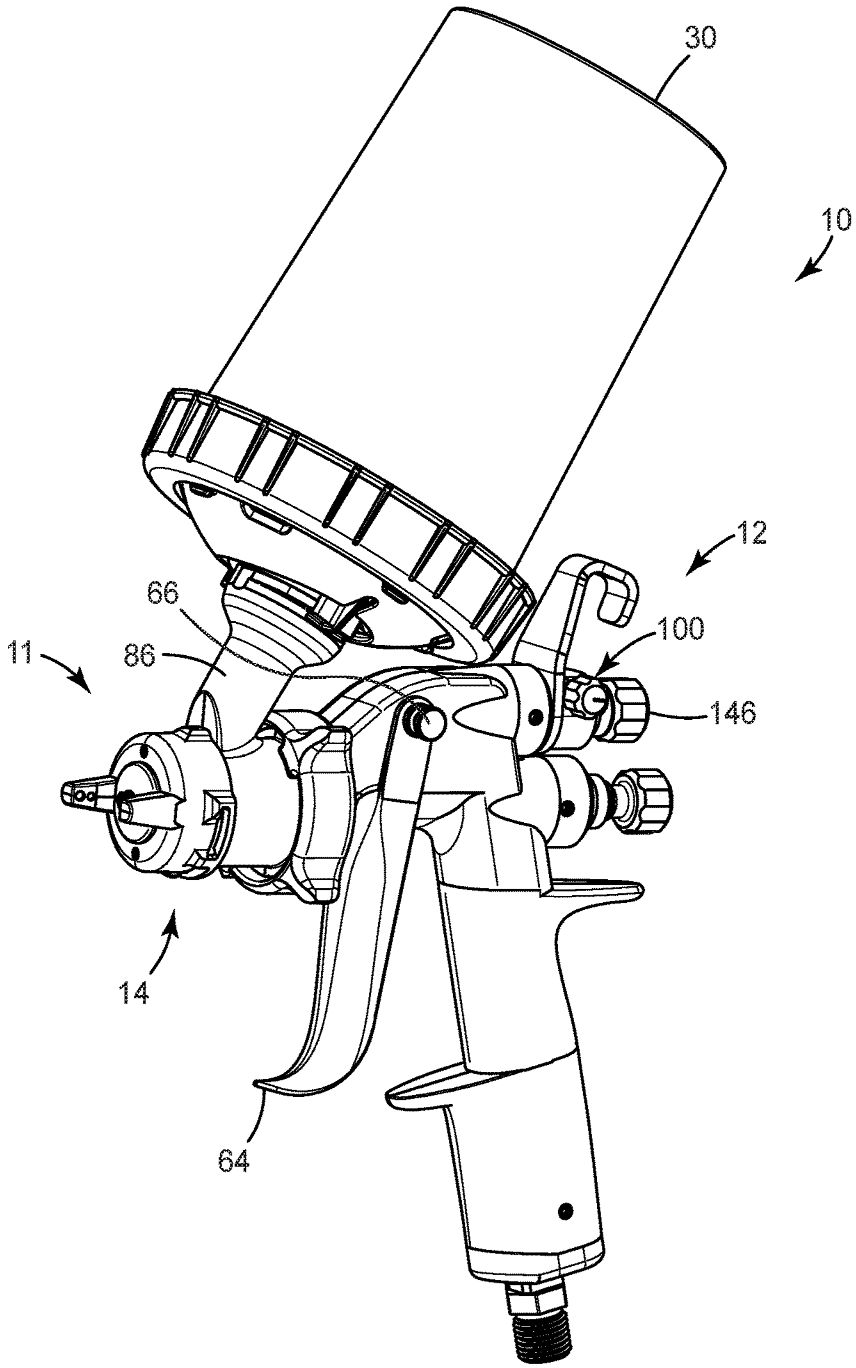
FIG. 1 is a schematic side view of one embodiment of a spray gun system that includes a spray gun, a spray gun converter, and a reservoir.

Unless otherwise indicated, all figures and drawings in this document are not to scale and are chosen for the purpose of illustrating different embodiments of the invention. In particular, the dimensions of the various components are depicted in illustrative terms only, and no relationship between the dimensions of the various components should be inferred from the drawings, unless so indicated.

DETAILED DESCRIPTION

In the following description of illustrative embodiments, reference is made to the accompanying figures of the drawing that form a part hereof, and in which are shown, by way of illustration, specific embodiments. It is to be understood that other embodiments may be utilized and structural changes may be made without departing from the scope of the present invention.

The present disclosure describes various embodiments of a spray gun converter that can convert a gravity-fed spray gun to a pressure-assisted spray gun by diverting a portion of the air supply to a liquid containing reservoir for pressure-assisted liquid delivery. The spray gun converter can be inserted into a manifold of a platform of the gravity-fed spray gun that feeds air to a nozzle center air outlet and a nozzle fan air outlet of a spray head assembly that is connected to the platform. The converter adds little to no additional bulk to the spray gun since the majority of the converter resides in the platform of the spray gun and, in some cases, replaces a fan control air valve. Additionally, by placing the converter in the manifold of the platform, the diversion of air to the reservoir has little to no effect on air flow through the nozzle center air and nozzle fan air outlets of the spray head assembly. The spray gun converter allows the user to adjust the amount of air that is diverted to the reservoir and can be turned completely off so that the spray gun operates solely in gravity-feed mode with the converter present. Additionally, or alternatively, the spray gun converter is reversibly attached to the spray gun platform so that it can be quickly and easily inserted or removed, depending upon the desired application.

The converter can include a reservoir air control valve that is adapted to direct a portion of pressurized air into one or more separate passages. One such passage can be adapted to direct pressurized air to a reservoir. In one or more embodiments, when the valve is in an open position, pressurized air can be directed to the reservoir to pressurize fluid contained therein above atmospheric pressure. Further, when the valve is in a closed position, pressurized air is not directed to the reservoir such that the spray gun operates in a more standard manner with a standard reservoir.

Figure 3:
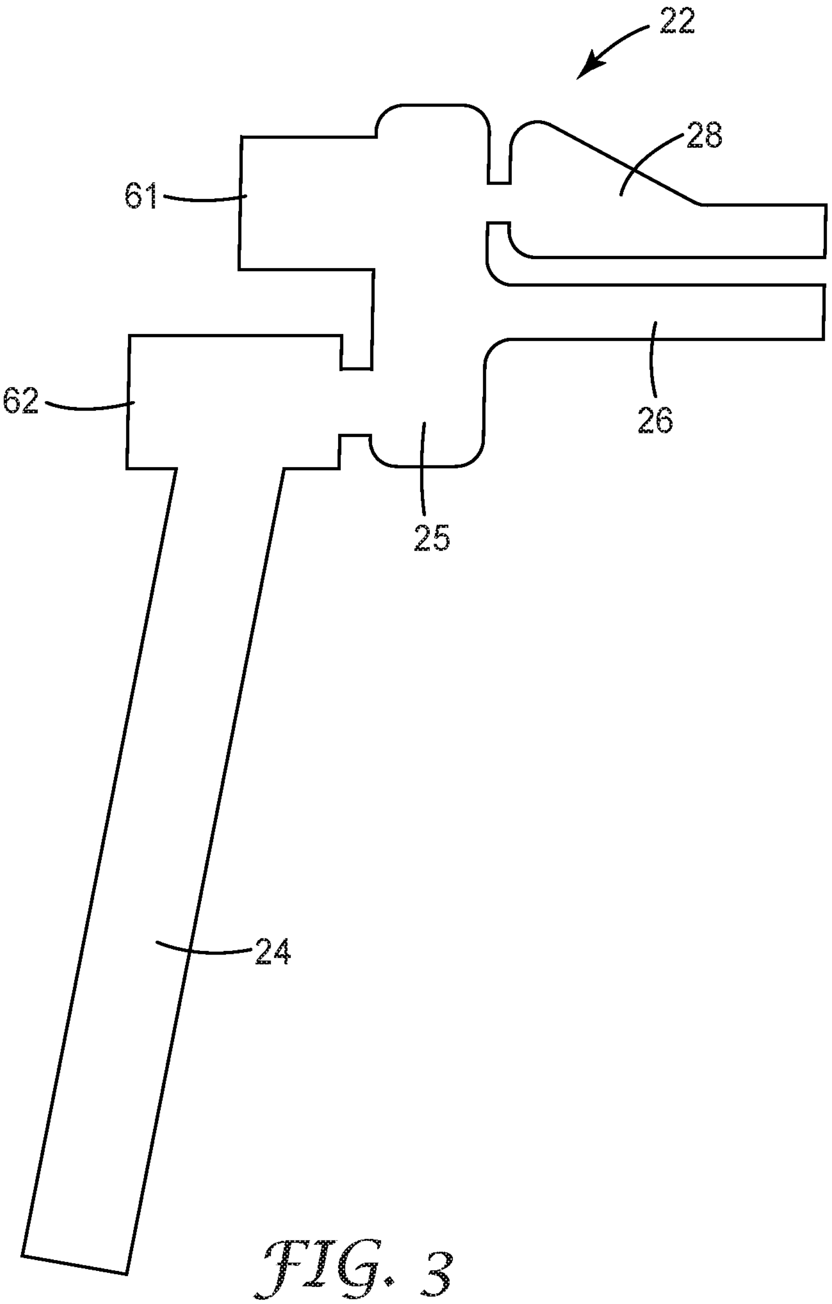
FIG. 3 is a schematic cross-sectional view of an air supply manifold of the spray gun of FIG. 1.
Figure 4:
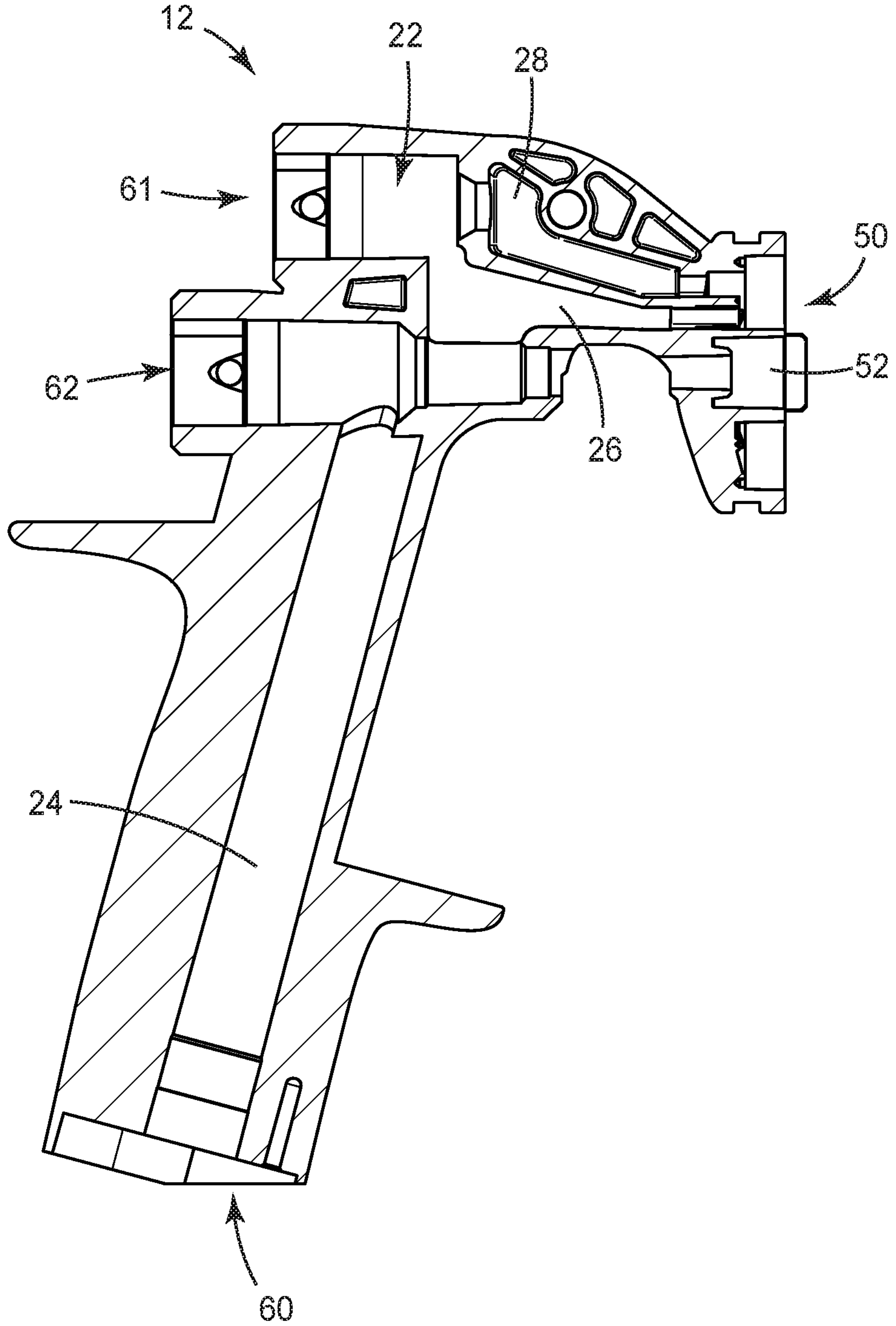
FIG. 4 is a schematic cross-sectional view of a frame of the spray gun of FIG. 1.
Figure 5:
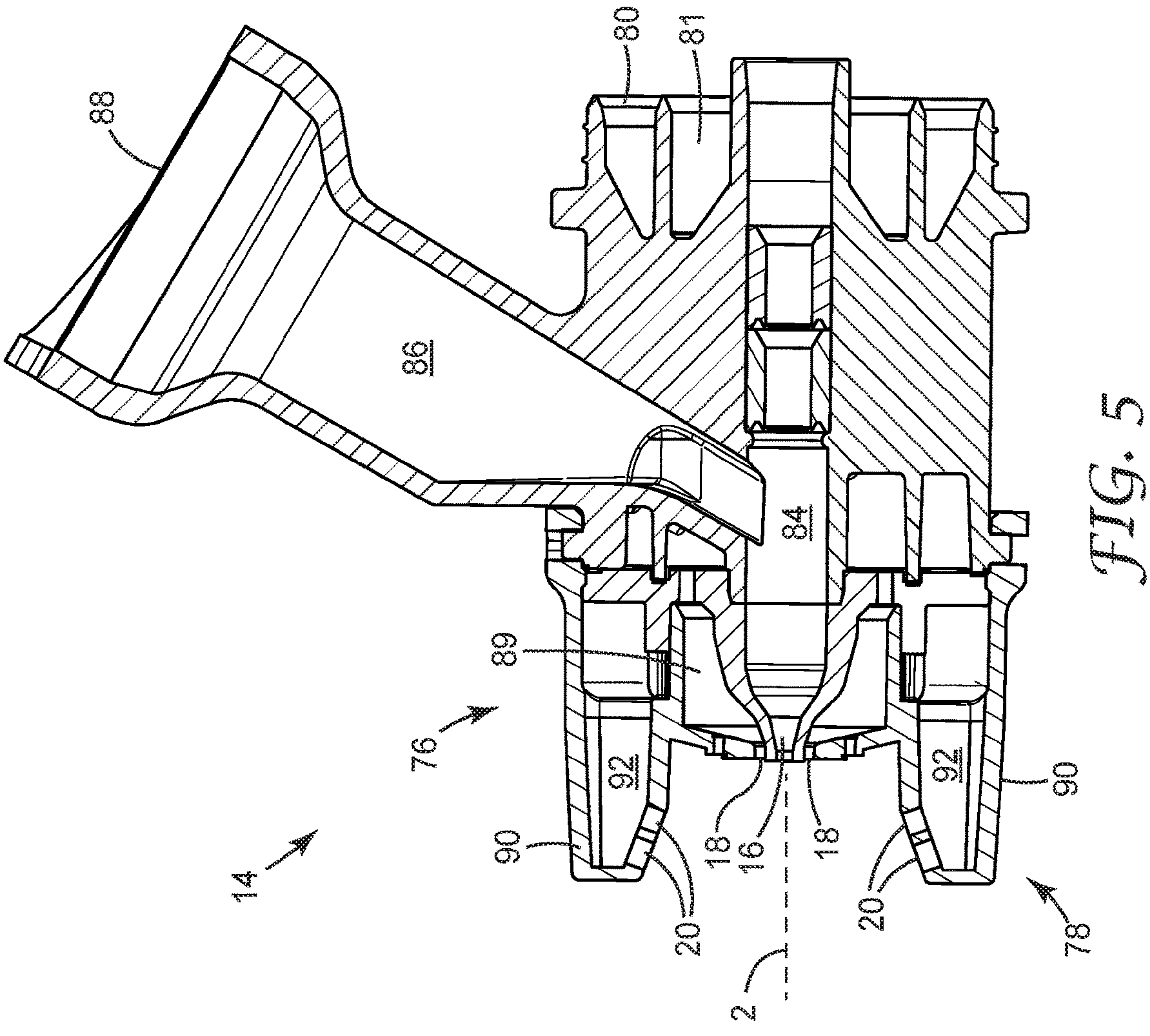
FIG. 5 is a schematic cross-sectional view of a spray head assembly of the spray gun of FIG. 1.
Figure 6:
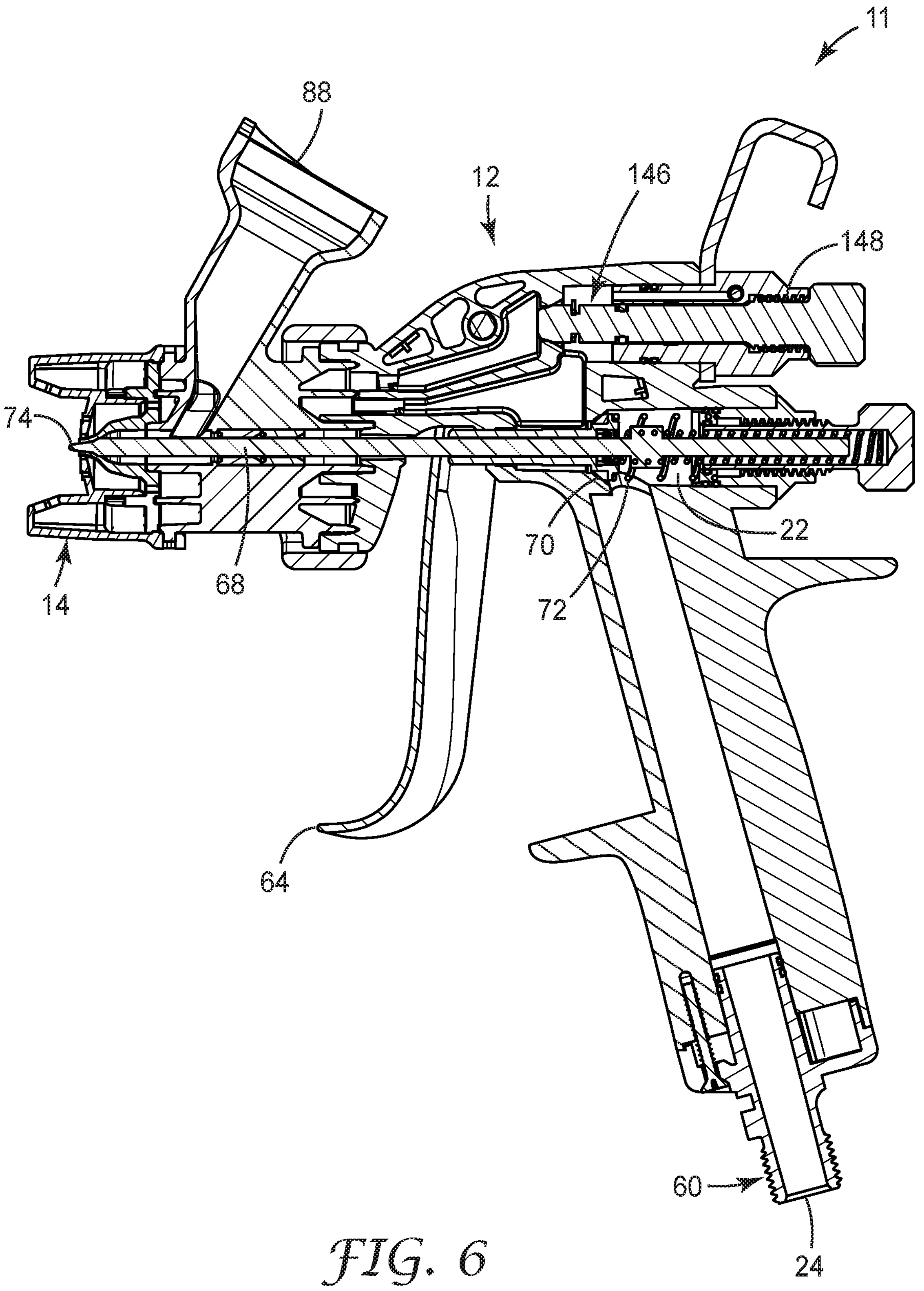
FIG. 6 is a schematic cross-sectional view of the spray gun of FIG. 1.

FIGS. 1-10 are various views of one embodiment of a spray gun system 10. The spray gun system 10 includes a spray gun 11 having a platform 12 and a spray head assembly 14 connected to the platform. As can be seen in FIG. 5, the spray head assembly 14 includes a nozzle fluid passage 84 that includes a nozzle fluid inlet 86 and nozzle fluid outlet 16. The assembly 14 further includes a nozzle center air passage 89 that includes a nozzle center air inlet 81 and a nozzle center air outlet 18. Further, the assembly 14 includes a nozzle fan air passage 92 that has a nozzle fan air inlet 80 and one or more nozzle fan air outlets 20.

The platform 12 includes a manifold 22 (FIGS. 3-4). The manifold 22 includes a chamber 25, a manifold air inlet 24 fluidly connected to the chamber, and a manifold center air outlet 26 and a manifold fan air outlet 28 each fluidly connected to the chamber. The manifold 22 also includes an access 61 and a second access 62 each fluidly connected to the chamber 25.

The spray gun 11 also includes a spray gun converter 100 that has a body 102 (FIGS. 7-9) having a first end 104 configured for insertion into the manifold 22 of the spray gun 11, a second end 106 having a converter fitting 108 configured for connection to a reservoir 30 (FIGS. 1-2), and a reservoir air passage 110 extending through the body from an inlet end 112 at the first end to an outlet end 114 on the converter fitting at the second end. The spray gun converter 100 also includes a reservoir air control valve 116 that opens and closes the reservoir air passage 110.

The spray gun 11 can include a variety of components including the platform 12 and the spray head assembly 14 that can be connected to the platform at a barrel interface 50 (FIG. 4). The spray gun 11 can include any suitable platform, e.g., one or more embodiments of a platform described in co-owned U.S. Pat. No. 8,590,809 to Escoto, Jr. et al., entitled LIQUID SPRAY GUN, SPRAY GUN PLATFORM, AND SPRAY HEAD ASSEMBLY. In one or more embodiments, the spray head assembly 14 can be releasably connected to the platform 12 and provide features that control movement of both a liquid to be sprayed and air used to spray the liquid as described herein. In one or more embodiments, the spray head assembly 14 is disposable and can be thrown away after use (although in some instances it may be reused). If disposed after use, cleaning of the spray head assembly 14 can be avoided, and the spray gun 11 can be changed over to dispense another liquid by attaching a different spray head assembly to the platform and the same or a different reservoir 30.

Connection of the spray head assembly 14 to the barrel interface 50 of the spray gun platform 12 may be achieved using any suitable technique or techniques. For example, connection structures on the spray head assembly 14 may cooperate (e.g., mechanically interlock) with openings 52 at the barrel interface 50 to retain the spray head assembly on the spray gun platform 12. Many other connection techniques and structures may be used in place of those described herein, e.g., a bayonet type connection that facilitates rapid connection/disconnection of the spray head assembly 14 with a push or push-twist action, clamps, threaded connections, etc.

The platform 12 can include any suitable material or materials, e.g., metals, metal alloys, plastics (e.g., polycarbonates, nylons (e.g., amorphous nylons), polypropylenes, etc.), and others. If plastic materials are used to construct the platform 12, such plastic materials may include any suitable additives, fillers, etc. Selection of the materials used in the platform 12 can be based at least in part on the compatibility of the selected materials with the materials to be sprayed (e.g., solvent resistance and other characteristics may need to be considered when selecting the materials used to construct the platforms).

The manifold 22 within the assembled platform 12 is made up of a variety of cavities that, taken together, form the passages that deliver air to the spray head assembly 14. For example, FIG. 3 depicts the cavities/air passages formed in the platform 12 with the surrounding structure of the platform removed for clarity. Among the cavities/passages formed in the platform 12 is the manifold 22.

The manifold 22 includes the chamber 25. The chamber 25 can take any suitable shape or shapes and have any suitable dimensions. The manifold 22 further includes the manifold air inlet 24 that can include a fitting 60 (FIG. 4) such that the manifold can be connected to an air source (not shown) that supplies air to the manifold at greater than atmospheric pressure. The manifold air inlet 24 can take any suitable shape or shapes and have any suitable dimensions. Although depicted as including one manifold air inlet 24, the manifold 22 can include any suitable number of inlets that can each be fluidly connected to the chamber 25 to supply air or gas to the manifold, e.g., one, two, three, four, five, or more inlets.

The manifold 22 also includes the manifold center air outlet 26 and the manifold fan air outlet 28. Each of the manifold center air outlet 26 and the manifold fan air outlet 28 can be fluidly connected to the chamber 25 using any suitable technique or techniques. Further, each of the manifold center air outlet 26 and the manifold fan air outlet 28 can take any suitable shape or shapes and have any suitable dimensions. Although depicted as having two outlets 26, 28, the manifold 22 can include any suitable number of outlets that are each fluidly connected to the chamber 25, e.g., one, two, three, four, five, or more outlets. In general, air flowing into the manifold 22 through one or more manifold air inlets 24 can be distributed to one or more outlets 26, 28 using any suitable technique or techniques.

The manifold 22 can also include any suitable number of accesses, ports, or openings. For example, as illustrated in FIG. 3, the manifold 22 includes the access 61 and the second access 62 each fluidly connected to the chamber 25 using any suitable technique or techniques. Further, each of the access and the second access 61, 62 can take any suitable shape or shapes and have any suitable dimensions. Although depicted as including two accesses 61, 62, the platform 12 can include any suitable number of accesses, e.g., one, two, three, four, five, or more accesses. The accesses 61, 62 can be utilized in any suitable manner to provide access to the chamber 25 or to facilitate control of air flow into and out of the manifold 22. For example, as is further described herein, the first end 104 of the body 102 of the spray gun converter 100 can be configured for insertion into the access 61 of the manifold 22 of the platform 12. In one or more embodiments, the first end of 104 of the body 102 of the spray gun converter 100 can be configured for insertion into the second access 62 of the manifold 22 of the platform 12.

Control over both gas or air flow and fluid flow through the spray gun 11 can be accomplished using any suitable technique or techniques. In one or more embodiments, a trigger 64 (FIG. 1) that is pivotally engaged to the platform 12, e.g., by a retaining pin 66 can control at least one of the air flow and fluid flow through the spray gun 11. The spray gun 11 can also include a needle 68 (FIG. 6) that extends through the spray head assembly 14 in a manner similar to that described in, e.g., U.S. Pat. No. 7,032,839. The trigger 64 can be biased to the inoperative position such that the needle 68 closes the nozzle fluid outlet 16 in the spray head assembly 14 and also closes an air supply valve 70. In the depicted embodiment, the biasing force is provided by a coil spring 72, although other biasing mechanisms may be used.

When the trigger 64 is depressed, needle 68 retracts and opens the air supply valve 70 to allow air to pass from the manifold 22 to the spray head assembly 14. As the trigger is further depressed, the needle 68 is retracted to a position in which a tapered front end 74 of the needle allows liquid to flow through nozzle fluid outlet 16 in the spray head assembly 14. Air flow can be further controlled by the spray gun converter 100 as is further described herein.

The manifold fan air outlet 28 (FIG. 3) is fluidly connected to the chamber 25 and routes air to the nozzle fan air outlets 20 of the spray head assembly 14 using any suitable technique or techniques. Further, the manifold center air outlet 26 (FIG. 3) is fluidly connected to the chamber 25 and routes air to the nozzle center air outlet 18 of the spray head assembly 14 using any suitable technique or techniques. Control over the air distribution from the chamber 25 of the manifold 22 to the manifold center air outlet 26 and the manifold fan air outlet 28 can be accomplished using any suitable technique or techniques as is further described herein.

Connected to the platform 12 of the spray gun 11 is the spray head assembly 14. As shown in FIG. 5, the assembly 14 further includes a barrel 76 and an air cap 78. The barrel 76 and the air cap 78 of the spray head assembly 14 can combine to form cavities that deliver the center air and the fan air in a substantially isolated manner through the spray head assembly.

The assembly 14 further includes the nozzle fluid passage 84 having the nozzle fluid inlet 86 and the nozzle fluid outlet 16. The nozzle fluid passage 84 can take any suitable shape or shapes and have any suitable dimensions. Fluid to be sprayed exits the assembly 14 through the nozzle fluid outlet 16. Fluid enters the nozzle fluid passage 84 from the nozzle fluid inlet 86 that is fed through a fluid port 88. The nozzle fluid passage 84 can be sized to receive the needle 68 (FIG. 6) that is capable of closing the nozzle fluid outlet 16 when advanced in the forward direction (to the left in the views depicted in FIGS. 5 and 6) and opening the nozzle fluid outlet when retracted in the rearward direction (to the right in FIGS. 5 and 6).

The assembly 14 also includes the nozzle center air passage 89 having the nozzle center air inlet 81 and the nozzle center air outlet 18. The nozzle center air passage 89 can take any suitable shape or shapes and have any suitable dimensions. The nozzle center air inlet 81 is fluidly connected to the manifold center air outlet 26 using any suitable technique or techniques.

The nozzle center air outlet 18 of the assembly 14 is formed in the air cap 78 such that it at least partially surrounds the nozzle fluid outlet 16. The spray head assembly 14 is adapted to direct the center air through the nozzle center air outlet 18 at greater than atmospheric pressure. As air exits the center air outlet it pulls liquid or fluid out of the nozzle fluid outlet 16 and atomizes the liquid stream into droplets of a generally conical stream about an axis 2 extending through the nozzle fluid outlet.

The assembly 14 also includes the nozzle fan air passage 92 having the nozzle fan air inlet 80 and the one or more nozzle fan air outlets 20. The nozzle fan air passage 92 can take any suitable shape or shapes and have any suitable dimensions. Further, the nozzle fan air inlet 80 is fluidly connected to the manifold fan air outlet 28 using any suitable technique or techniques.

The air cap 78 that is provided as a part of the spray head assembly 14 can be connected to the barrel 76 utilizing any suitable technique or techniques. In one or more embodiments, the air cap 78 is connected to the barrel 76 in a manner that allows for rotation of the air cap about the axis 2 relative to the barrel. In one or more embodiments, rotation of the air cap 78 can be used to change an orientation of a pattern of the atomized spray emitted from the spray head assembly 14 relative to the axis 2.

The air cap 78 can include one or more air horns 90, each of which defines at least a portion of the nozzle fan air passage 92. Fan air delivered into the air horns 90 exits through one or more nozzle fan air outlets 20 on the air horns. The outlets 20 on the horns 90 can be located on opposite sides of the axis 2 such that air flowing through the barrel 76 under greater than atmospheric pressure flows against opposite sides of the atomized stream of fluid flowing from the nozzle. The forces exerted by the fan air can be used to change the shape of the stream of fluid to form a desired spray pattern. The size, shape, orientation, and other features of the fan air control outlets 20 can be adjusted to achieve different fan control characteristics as described, e.g., in U.S. Pat. No. 7,201,336 B2 to Blette and entitled LIQUID SPRAY GUN WITH NON-CIRCULAR HORN AIR OUTLET PASSAGEWAYS AND APERTURES. The fan air outlets 20 can take any suitable shape or shapes, e.g., elliptical, rectilinear, etc.

Figure 2:
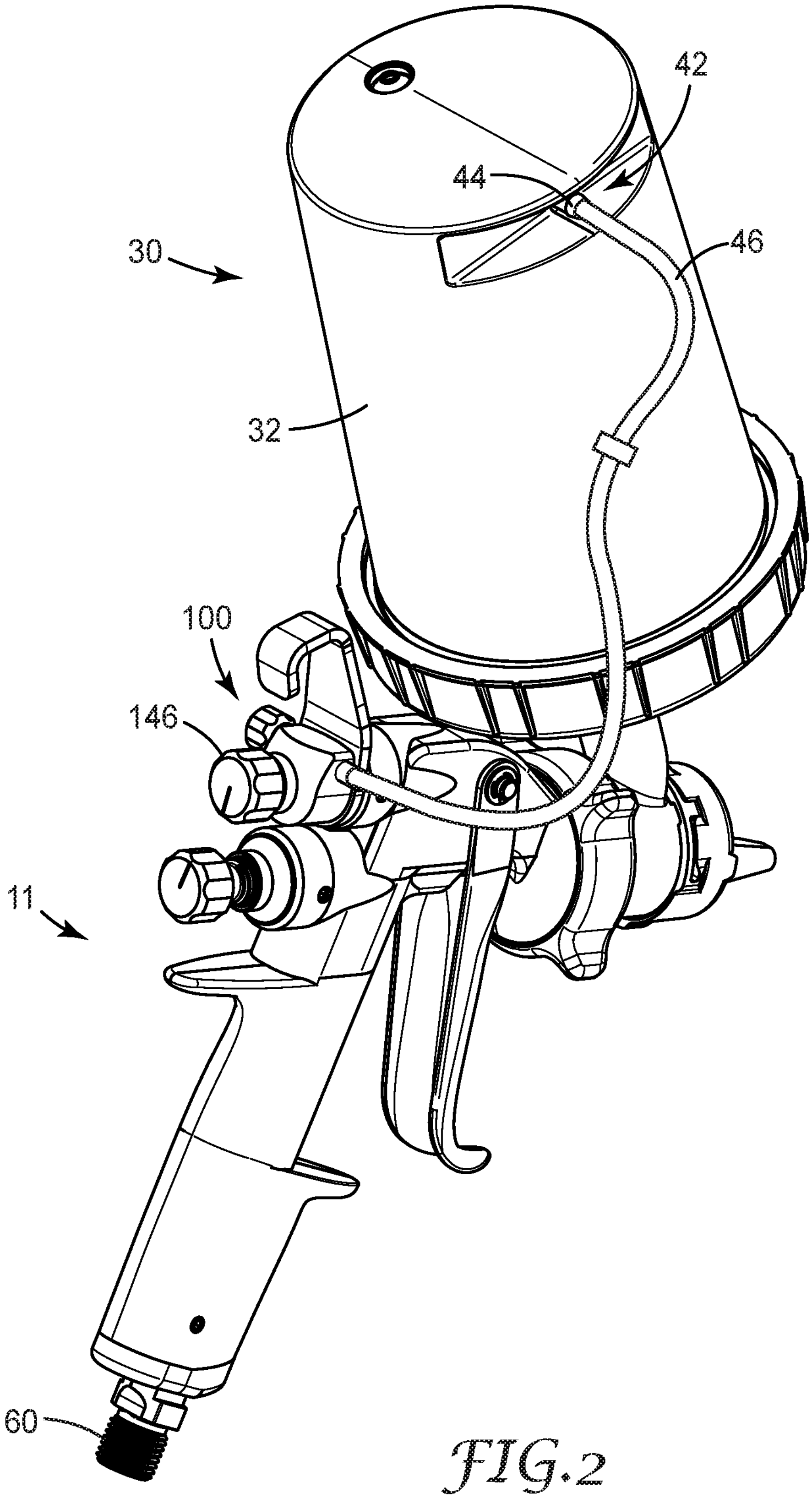
FIG. 2 is a schematic perspective view of the spray gun system of FIG. 1.
Figure 10:
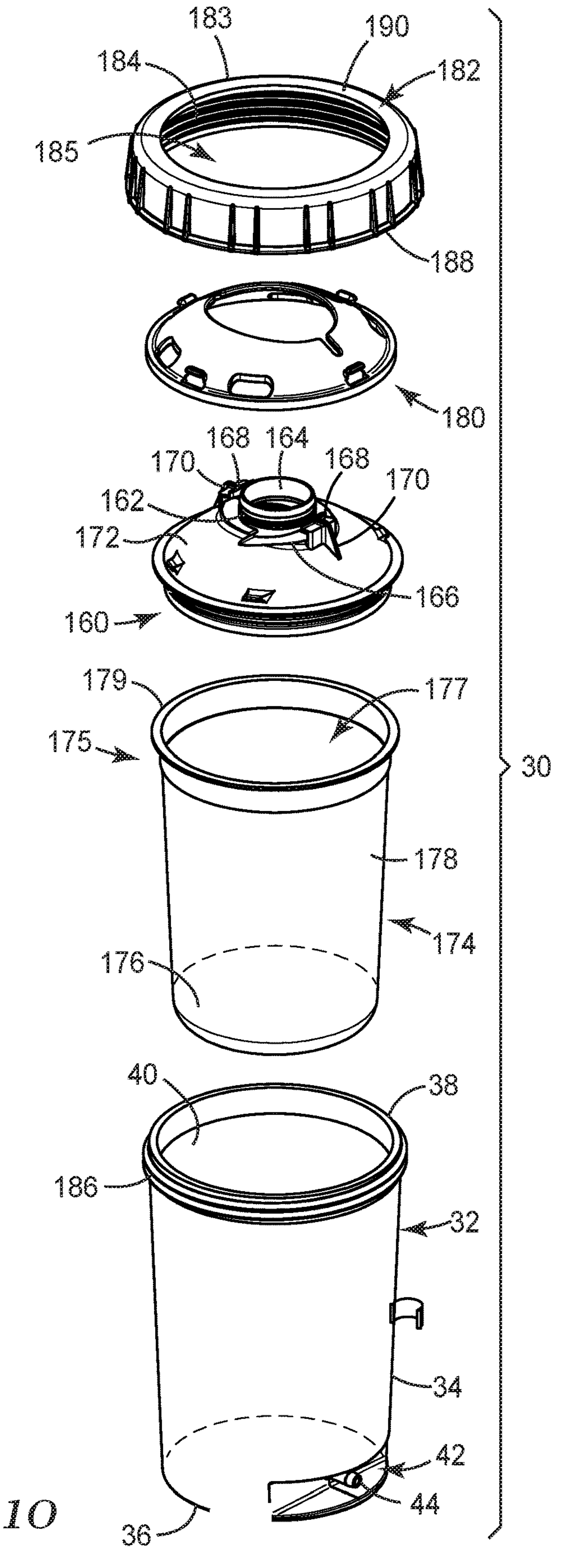
FIG. 10 is a schematic exploded view of the reservoir of the spray gun system of FIG. 1.

The spray gun system 10 also includes the reservoir 30. Any suitable reservoir or container can be utilized with system 10, e.g., one or more embodiments of the containers described in U.S. Pat. No. 7,410,106 to Escoto, Jr., et al. and entitled PRESSURIZED LIQUID SUPPLY ASSEMBLY. As shown in FIG. 10, The reservoir 30 disclosed herein includes a container 32 that has a side wall 34, a bottom end 36, and a top end 38 having a container opening 40 therein. The reservoir 30 also includes a reservoir inlet 42 within the side wall 34, and a reservoir fitting 44 extending outward from the side wall. The reservoir fitting 44 is adapted to connect the reservoir 30 to a reservoir connector 46 (FIG. 2). The reservoir 30 can also include one or more additional features, such as distribution fins to improve air flow and distribution within the container 32. See, e.g., U.S. Pat. No. 7,410,106.

The container 32 of the reservoir 30 can be adapted to withstand any suitable air pressure. In one or more embodiments, the container 32 is capable of withstanding a relatively high air pressure, e.g., greater than about 69.0 kPa (10 psi), greater than about 137.9 kPa (20 psi), etc.

The reservoir 30 also includes a lid component 160. The lid component 160 can include a filter component (not shown) either permanently or temporarily attached to a lower surface of the lid component that faces an interior of the container 32 when the lid component is connected to the container. The lid component 160 can further include one or more components capable of connecting to the fluid port 88 of the spray head assembly 14, where the one or more components are positioned on an outer surface and at a second end of the lid component. For example, the lid component 160 can include axially-spaced radially outwardly projecting sealing rings 162 along an outer surface of cylindrical portion 164 positioned on boss 166, and opposed inwardly projecting lips 168 on the distal ends of projecting hook members 170, which are equally spaced from and on either side of cylindrical portion extending from outer surface 172 of exemplary lid component 160. These various component features may be used to attach the lid component 160 to the fluid port 88, e.g., as described in U.S. Pat. No. 6,536,687 to Navis et al. and entitled MIXING CUP ADAPTING ASSEMBLY.

The reservoir 30 can also include a liner 174. The liner 174 can include at least one liner side wall 178, a liner bottom end 176, a liner top end 175 having a liner opening 177 therein, and a liner rim 179 extending along and protruding from the liner top end. In one or more embodiments, the liner 174 is self-supporting and collapsible. In one or more embodiments, the liner 174 has a comparatively rigid base 176 and comparatively thin side walls 178 so that the liner collapses in the longitudinal direction by virtue of the side walls collapsing rather than the base.

The reservoir 30 can also include a shroud component 180 that is adapted to provide support to the lid component 160 by extending over and restricting expansion of the lid component when exposed to high pressure. Like the above-described lid component 160, the shroud component 180 can include an injection-molded part formed from a plastic material such as polypropylene or polyamide. In one or more embodiments, shroud component 180 can be transparent to enable viewing of the lid component 160 and the contents within the liquid supply assembly.

The reservoir 30 can further include a collar 182 that has a top end 183 having a collar opening 185 therein, a bottom end 188, and at least one collar side wall extending between the top end and the bottom end, a collar rim 190 extending along the top end and protruding into the collar opening, and a set of threads 184 extending along the at least one collar side wall, where the set of threads is capable of engaging with a set of threads 186 of the container 32.

The reservoir 30 can further include one or more additional, optional components. Suitable optional components include, but are not limited to, a filter element that can be permanently or temporarily attached to the lid component, a gasket that can be positioned between the lid component and the liner (or liner component of the container), an indicating sheet having indicia thereon to assist a user when introducing one or more liquids into the collapsible liner, and an adapter for connecting the lid component to a spraying device positioned between the lid component and the spraying device.

Figure 7:
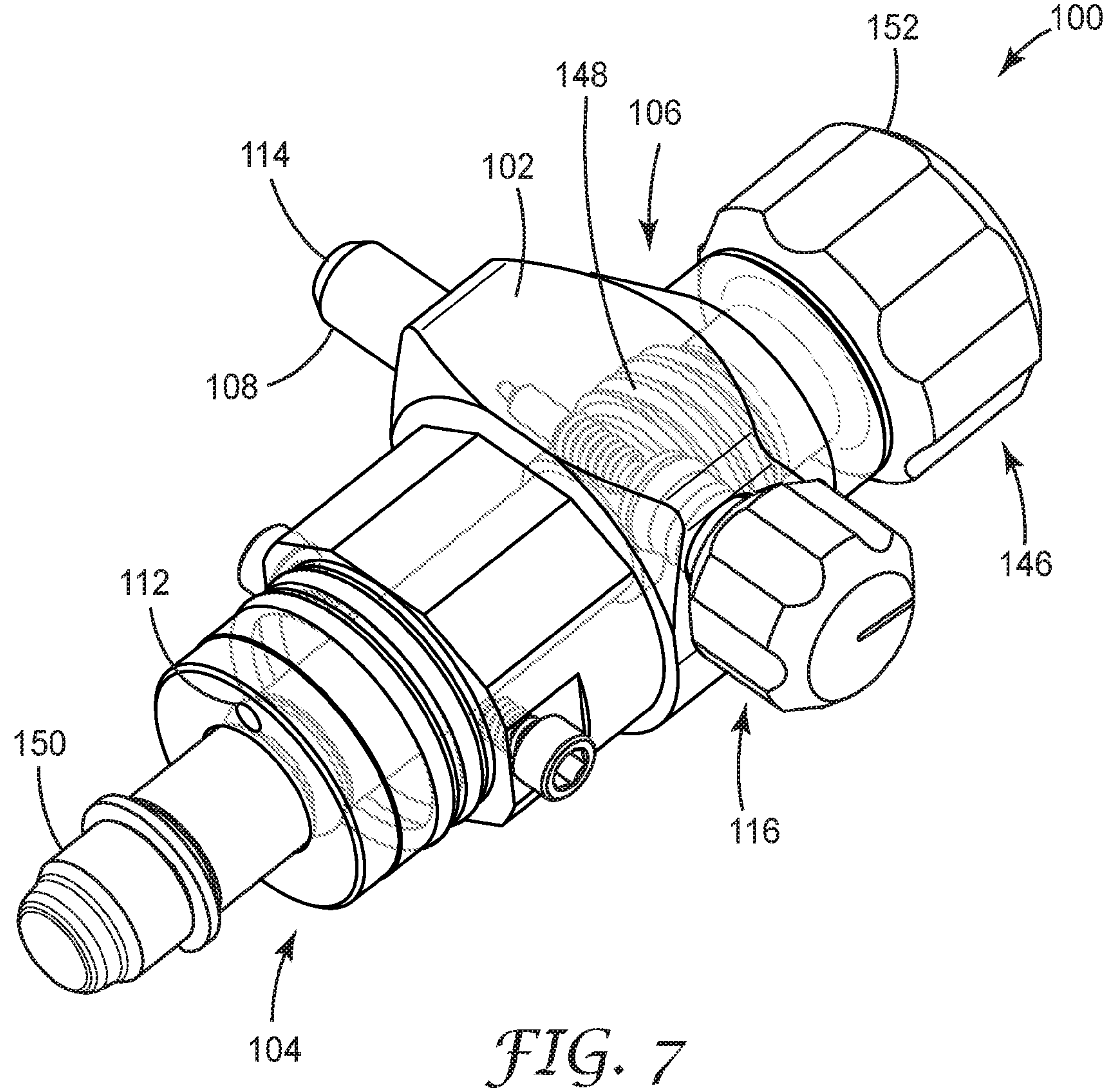
FIG. 7 is a schematic perspective transparent view of the spray gun converter of FIG. 1.
Figure 8:
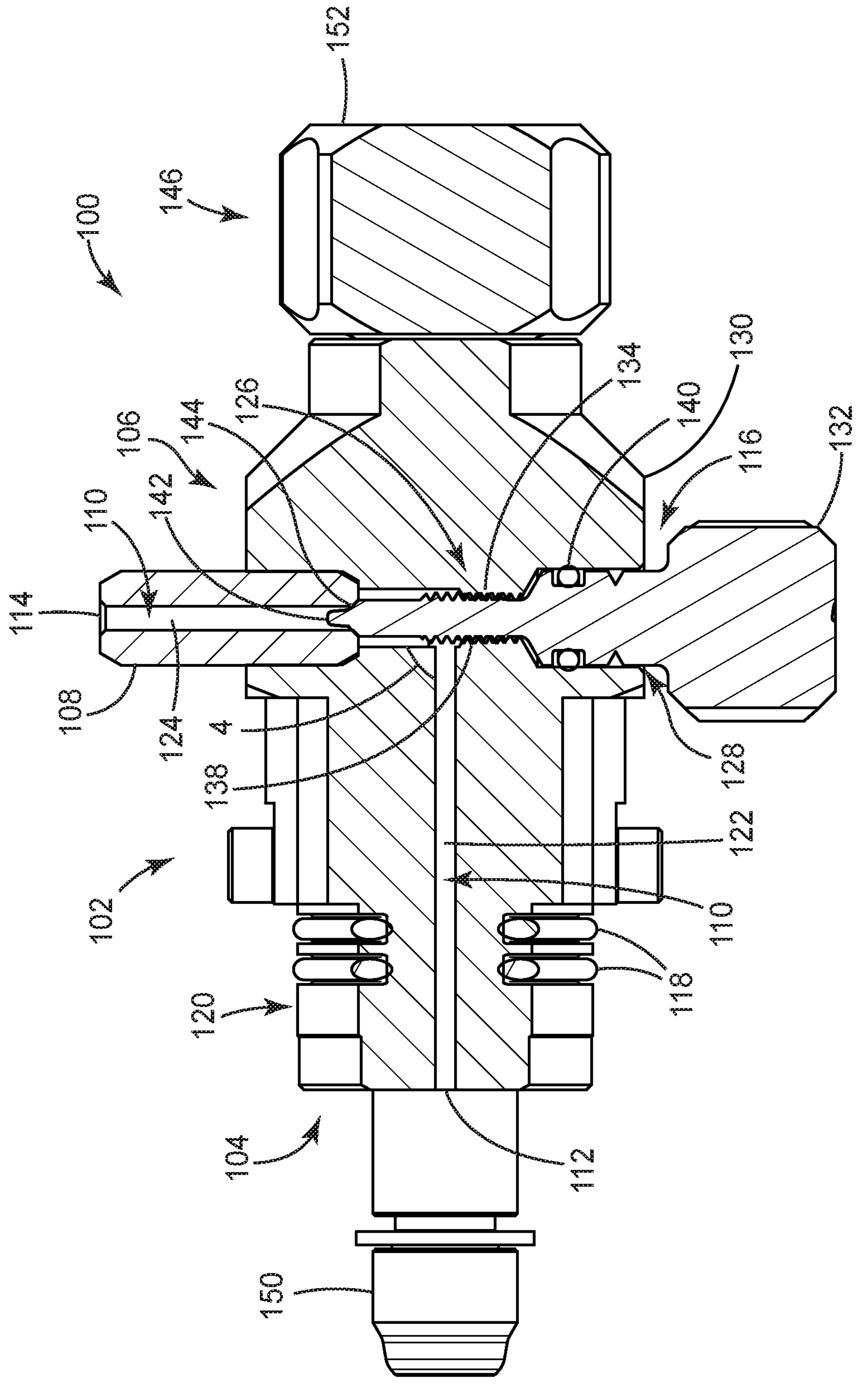
FIG. 8 is a schematic cross-sectional view of the spray gun converter of FIG. 1 with a reservoir air passage of a body of the converter closed by a reservoir air control valve of the converter.
Figure 9:
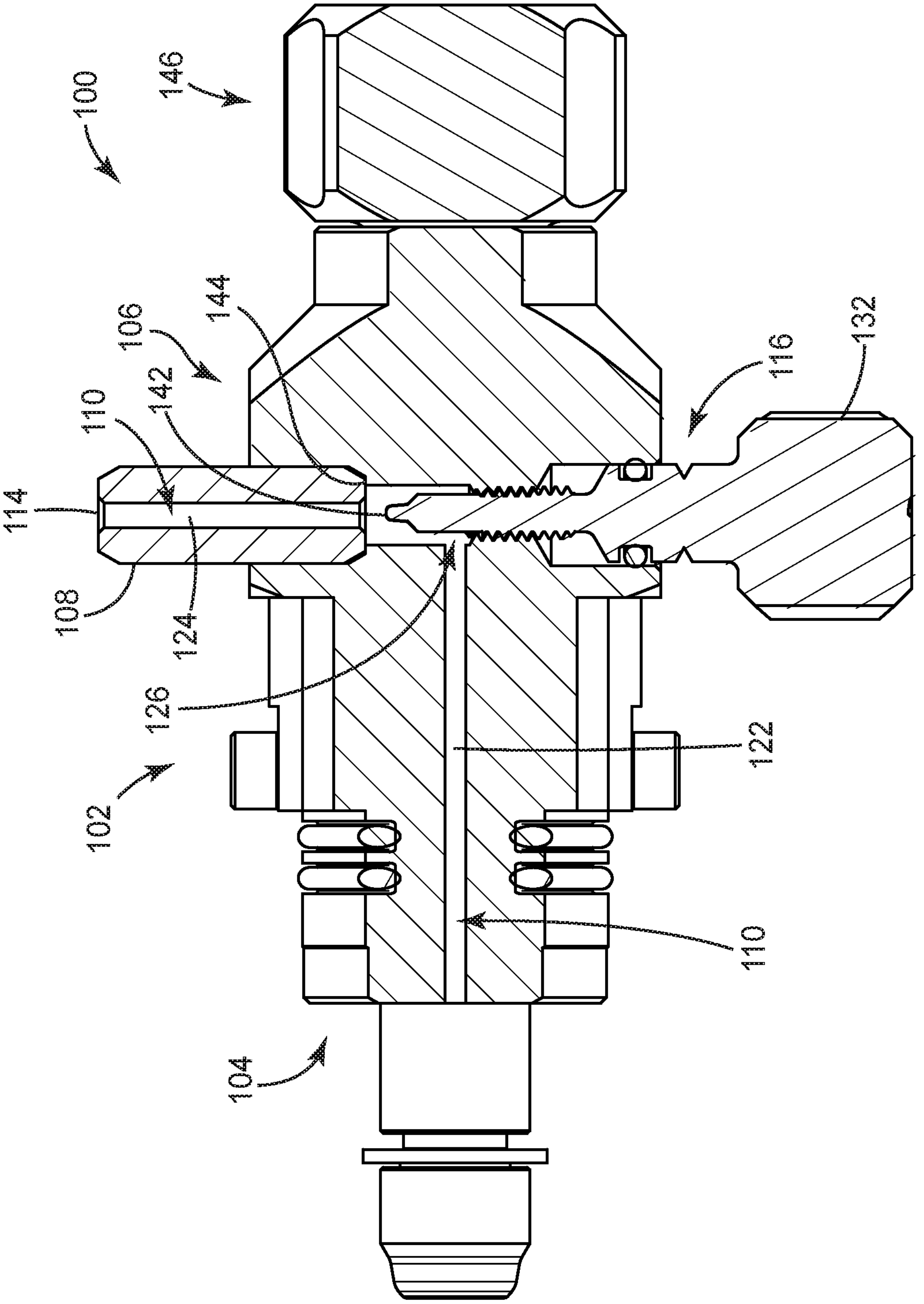
FIG. 9 is a schematic cross-sectional view of the spray gun converter of FIG. 1 with the reservoir air passage of the body of the converter opened by the reservoir air control valve of the converter.

The spray gun 11 also includes the spray gun converter 100. As shown in FIGS. 7-9, the converter 100 includes the body 102 having the first end 104 that is configured for insertion into the manifold 22 of the platform 12. The body 102 further includes the second end 106 that has a converter fitting 108 that is configured for connection to the reservoir 30. Further, the body 102 includes the reservoir air passage 110 that extends through the body from the inlet end 112 at the first end 104 to the outlet end 114 on the converter fitting 108 at the second end 106. The converter 100 also includes the reservoir air control valve 116 that opens (FIG. 9) and closes (FIG. 8) the reservoir air passage 110. The body 102 can include any suitable material or materials, e.g., at least one of a metallic, polymeric, or other inorganic material. The body 102 can be manufactured utilizing any suitable technique or techniques, e.g., casting, molding, machining, 3D printing, or any other additive or subtractive manufacturing techniques.

The body 102 can take any suitable shape or shapes and have any suitable dimensions. In one or more embodiments, the body 102 is configured such that at least a portion of the body can be inserted into the manifold 22 of the spray gun platform 12. For example, the first end 104 of the body 102 can be configured to be inserted into the access 61 of the manifold 22. In one or more embodiments, the first end 104 of the body 102 can be configured to be inserted into the second access 62 of the manifold 22. In one or more embodiments, the converter 100 can include a gasket 118 disposed adjacent to the first end 104 of the body 102. As used herein, the term "adjacent to the first end" means that an element or component is disposed closer to the first end 104 of the body 102 of the converter 100 than to the second end 106 of the body. The gasket 118 can surround at least a portion of the first end 104 of the body 102. The gasket 118 can include any suitable material or materials and have any suitable dimensions such that the gasket provides an air seal between the body 102 of the converter 100 and the manifold 22. Although depicted as including two gaskets 118, the converter 100 can include any suitable number of gaskets, e.g., one, two, three, four, five, or more gaskets. Further, in one or more embodiments, the body 102 can include a slot 120 that is adapted to receive at least a portion of the gasket 118 such that the gasket remains connected to the body 102.

The second end 106 of the body 102 includes the converter fitting 108. The converter fitting 108 can be disposed in any suitable location relative to the first end 104 of the body 102. In one or more embodiments, the converter fitting 108 can be disposed at the second end 106 of the body 102. In one or more embodiments, the converter fitting 108 is disposed adjacent to the second end 106 of the body 102. As used herein, the term "adjacent to the second end" means that an element or component is disposed closer to the second end 106 of the body 102 than to the first end 104.

The converter fitting 108 can take any suitable shape or shapes and have any suitable dimensions. In one or more embodiments, the converter fitting 108 is configured to be connected to the reservoir connector 46 of the reservoir 30 using any suitable technique or techniques. In one or more embodiments, the reservoir connector 46 can be fitted over the converter fitting 108 such that at least a portion of the fitting is disposed within the connector. Although not shown, in one or more embodiments, the converter fitting 108 can include one or more rings or lips disposed on an outer surface of the fitting to retain the reservoir connector 46 when the connector is disposed over the fitting.

Extending through the body 102 of the converter 100 is the reservoir air passage 110. The passage is configured for fluid connection to the chamber 25 of the manifold 22 of the platform 12. The passage 110 can take any suitable shape or shapes and have any suitable dimensions. The passage 110 extends from the inlet end 112 of the reservoir air passage 110 at the first end 104 of the body 102 to the outlet end 114 of the reservoir air passage 110 on the converter fitting 108 at the second end 106. The passage 110 includes a first portion 122 that extends from the inlet end 112 and a second portion 124 that extends from the outlet end 114. The first and second portions 122, 124 form an intersection 126 in the body 102 of the spray gun converter 100. The first portion 122 of the reservoir air passage 110 can form any suitable angle 4 with the second portion 124 as shown in FIG. 8. In one or more embodiments, the first and second portions 122, 124 are at substantially right angles at the intersection 126. As used herein, the term "substantially right angle" means that the angle 4 formed by the first and second portions 122, 124 of the passage 110 at the intersection 126 is at least 80 degrees and no greater than 110 degrees.

In one or more embodiments, the second portion 124 of the reservoir air passage 110 extends through the body 102 from the outlet end 114 to an opening 128 in the body 102 opposite the outlet end 114. In one or more embodiments, the second portion 124 linearly extends from the outlet end 114 to the opening 128.

The converter 100 also includes the reservoir air control valve 116. The valve 116 is adapted to open and close the reservoir air passage 110. The valve 116 can include any suitable valve or valves. In one or more embodiments, the valve 116 is a threaded needle valve that includes a reservoir air control knob 132.

As shown in FIGS. 7-9, the valve 116 can include one or more threads 134 that are adapted to engage one or more threads 138 disposed in the second portion 124 of the reservoir air passage 110. The valve 116 can take any suitable shape or shapes and have any suitable dimensions. In one or more embodiments, the valve 116 can include one or more gaskets 140. The gasket 140 can provide an air seal between the valve 116 and an inner wall of the second portion 124 of the reservoir air passage 110.

The valve 116 can be located at the intersection 126 of the first portion 122 and the second portion 124 of the reservoir air passage 110. In one or more embodiments, the valve 116 is threaded into the opening 128 of the second portion 124.

As mentioned herein, the reservoir air control valve 116 opens and closes the reservoir air passage 110 using any suitable technique or techniques. In one or more embodiments, the valve 116 can be adjusted to close, partially open, or completely open the reservoir air passage 110. When in the closed position as shown in FIG. 8, an end 142 of the valve 116 can extend into the second portion 124 of the reservoir air passage 110 and prevent air from the first portion 110 of the reservoir air passage 110 that has entered the passage through the inlet end 112 from passing into the second portion and through the outlet end 114 of the passage. In one or more embodiments, the end 142 of the valve 116 can be shaped to engage a ledge 144 of the second portion 124 of the reservoir air passage 110 to seal the outlet end 114 of the second portion.

Further, as shown in FIG. 9, the reservoir air control valve 116 can open the reservoir air passage 110 using any suitable technique or techniques. In one or more embodiments, the valve 116 can be rotated such that the end 142 of the valve is withdrawn from the ledge 144 of the second portion 124, thereby allowing air to flow through the intersection 126 from the first portion 122 and into the second portion. Such air then flows through the outlet end 114 of the second portion 124 and into the reservoir connector 46, where it is directed into the container 32 of the reservoir 30. Such air can pressurize the container 32 and provide pressurized fluid to the spray head assembly 14 of the spray gun 11 through the fluid port 88.

Although the spray gun 11 is illustrated as having the reservoir 30 disposed above the platform 12 when the spray gun is oriented in an in-use position, the spray gun can include a spray head assembly that can be adapted such that the reservoir is disposed below the platform. In such embodiments, the converter 100 can be utilized to provide gas or air to the reservoir 30 to provide pressure-assisted flow if the reservoir air control valve 116 is at least partially opened. Further, with the reservoir air control valve 116 closed, the spray gun 11 would operate as a standard bottom feed spray gun.

In one or more embodiments, the spray gun connector 100 can also include a fan air control valve 146. The fan air control valve 146 can open and close the manifold fan air outlet 28. The valve 146 can include any suitable valve. In one or more embodiments, the valve 146 can include a threaded spindle 148 that extends through the body 102 of the spray gun converter 100 from the first end 104 to the second end 106. The valve 146 can also include a valve plug 150 attached to the threaded spindle 148 adjacent to the first end 104 of the body 102 of the converter 100.

The fan air control valve 146 can control air delivered to the manifold fan air outlet 28 from the chamber 25. As a result, the fan air control valve 146 can control air flow to the air horns 90 of the spray head assembly 14 to adjust the spray pattern geometry. Further, the fan air control valve 146 can include a fan air control knob 152 attached to the spindle 148 adjacent to the second end 106 of the body 102. In one or more embodiments, the threaded spindle 148, the valve plug 150, and the fan air control knob 152 can be a single component, i.e., manufactured as one part. In one or more embodiments, the threaded spindle 148, the valve plug 150, and the fan air control knob 152 can be manufactured separately and connected together utilizing any suitable technique or techniques.

The reservoir air control valve 116 and the fan air control valve 146 can be disposed in any suitable position relative to each other. For example, in one configuration, the reservoir air control valve 116 is positioned to at least partially open the reservoir air passage 110, and the fan air control valve 146 is positioned to at least partially open the manifold fan air outlet 28. In such a configuration, air flows through the reservoir air passage 110, through the outlet end 114, through the reservoir connector 46, and into the container 32. Such air can be utilized to pressurize the fluid disposed within the container 32 and provide such pressurized fluid to the spray head assembly 14. Further, in this configuration, air also flows through the manifold fan air outlet 28 and out the nozzle fan air outlets 20.

In an alternative configuration, the reservoir air control valve 116 is positioned to close the reservoir air passage 110, and the fan air control valve 146 is positioned to at least partially open the manifold fan air outlet 28. In yet a further embodiment, the reservoir air control valve 116 is positioned to close the reservoir air passage 110, and the fan air control valve 146 is positioned to close the manifold fan air outlet 28. When the reservoir air control valve 116 is closed, the spray gun can be made to operate as a standard gravity fed gun by removing the reservoir connector 46 so that the pressure in the reservoir remains at atmospheric pressure during operation of the gun. Failure to remove the reservoir connector 46 will essentially seal the reservoir so that as the fluid is drawn into the gun, the pressure inside the reservoir drops. This drop in pressure will retard fluid flow from the reservoir and the nozzle fluid outlet 16.

Figure 11:
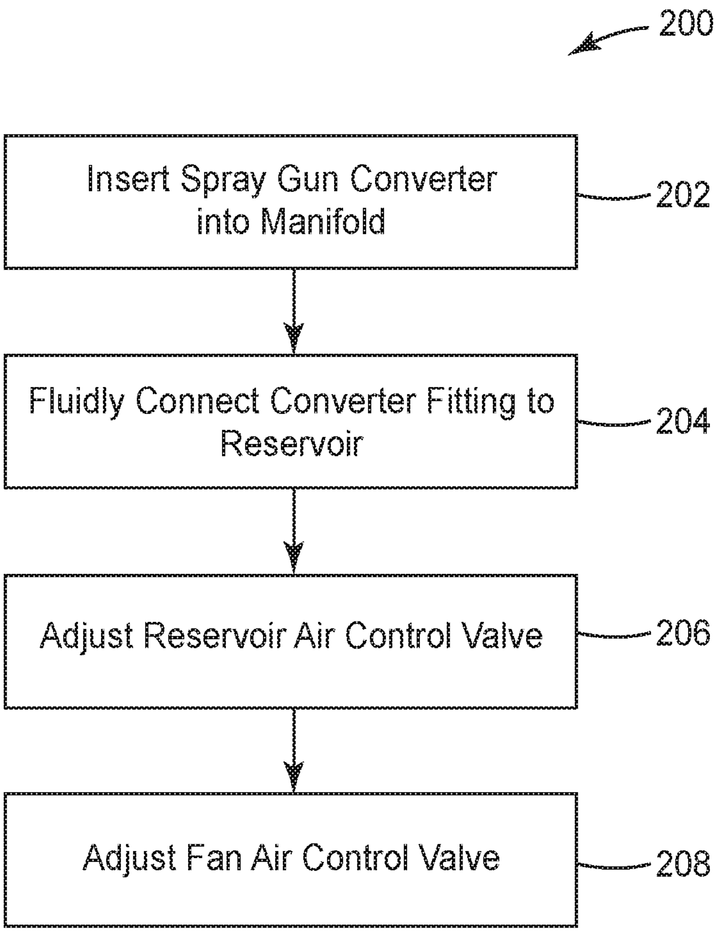
FIG. 11 is a flow chart of a method for converting a gravity-fed spray gun to a pressure-assisted spray gun.

Any suitable technique or techniques can be utilized with the spray gun system 10 to convert a gravity-fed spray gun to a pressure-assisted spray gun 11. For example, FIG. 11 is a flowchart of one embodiment of a method 200 of converting the spray gun 11 of the spray gun system 10. Although described in regard to the spray gun 11 and spray gun converter 100 of the spray gun system 10 of FIGS. 1-10, the method 200 can be utilized with any suitable spray gun and converter.

At 202, the spray gun converter 100 is inserted into the manifold 22 of the gravity-fed spray gun 11. In one or more embodiments, the first end 104 of the body 102 of the converter 100 is inserted into the access 61 or the second access 62 of the manifold 22. In one or more embodiments, a standard control valve can be removed from the platform 12 if present prior to insertion of the converter 100 into the manifold 22. When use of a pressurized reservoir 30 is desired, such reservoir is connected to the platform 12 using any suitable technique or techniques. The converter fitting 108 is fluidly connected to the reservoir 30 at 204 using any suitable technique or techniques. In one or more embodiments, at least a portion of the converter fitting 108 can be disposed within the reservoir connector 46. The reservoir air control valve 116 can be adjusted at 206 so that the reservoir air passage 110 is at least partially open. When the reservoir air control valve 116 is at least partially open, air from the manifold 22 can be directed into the reservoir air passage 110 through the inlet end 112. Such air can then be directed through the outlet end 114 and into the reservoir connector 46. This air can be utilized to pressurize the fluid disposed within the container 32. As discussed herein, the pressurized fluid can be directed to the spray head assembly 14 using any suitable technique or techniques to direct a liquid coating from the system 10 and onto a surface. In embodiments where a standard gravity-fed reservoir 30 is desired, the reservoir air control valve 116 can be manipulated such that the reservoir air passage 110 is closed.

In one or more embodiments, the fan air control valve 146 can be adjusted at 208 so that the valve is at least partially open. When the fan air control valve 146 is at least partially open, air from the manifold 22 can flow into the manifold fan air outlet 28 and through the nozzle fan air outlets 20 of the spray head assembly 14.

All references and publications cited herein are expressly incorporated herein by reference in their entirety into this disclosure, except to the extent they may directly contradict this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A spray gun converter comprising:

a body comprising:

a first end configured for insertion into a manifold of a spray gun, wherein the manifold comprises a manifold fan air outlet;

a second end having a converter fitting configured for connection to a reservoir, and a reservoir air passage extending through the body from an inlet end at the first end to an outlet end on the converter fitting at the second end, wherein the inlet end is configured to fluidically couple to the manifold when assembled;

a reservoir air control valve that opens and closes the reservoir air passage; and a fan air control valve, comprising:

a threaded spindle extending through the body of the spray gun converter from the first end to the second end;

a valve plug attached to the threaded spindle proximate the first end of the body. wherein the valve plug is configured to engage with a portion of the manifold fan air outlet; and a fan air control knob attached to the spindle proximate the second end of the body.

2. The spray gun converter of claim 1, further comprising a gasket surrounding at least a portion of the first end of the body.

3. The spray gun converter of claim 1, wherein the reservoir air control valve is a threaded needle valve comprising a reservoir air control knob.

4. The spray gun converter of claim 1, wherein the reservoir air passage comprises a first portion that extends from the inlet end and a second portion that extends from the outlet end, the first and second portions forming an intersection in the body of the spray gun converter.

5. The spray gun converter of claim 4, wherein the first and second portions are at substantially right angles at the intersection.

6. The spray gun converter of claim 4, wherein the reservoir air control valve is located at the intersection of the first portion and second portion of the reservoir air passage.

7. The spray gun converter of claim 4, wherein the second portion of the reservoir air passage extends linearly though the body from the outlet end to an opening in the body opposite the outlet end, wherein the reservoir air control valve is threaded into the opening, and wherein the reservoir air control valve can be adjusted to close, partially open or completely open the reservoir air passage.

8. The spray gun converter of claim 1, wherein the body comprises a slot disposed adjacent to the first end of the body, the slot is adapted to receive at least a portion of a gasket.

9. The spray gun converter of claim 8, wherein the inlet end is positioned closer to the first end than the slot.

10. The spray gun converter of claim 1, wherein the manifold fan air outlet is fluidly connected to air horns on a spray head assembly of the spray gun, and the air horns comprise nozzle fan air outlets that direct air to shape the atomized liquid into a desired spray pattern.

11. A spray gun comprising:
- a platform comprising a manifold, wherein the manifold comprises:
  - a chamber;
  - a manifold air inlet fluidly connected to the chamber;
  - a manifold center air outlet and a manifold fan air outlet each fluidly connected to the chamber; and
  - an access fluidly connected to the chamber;
- a spray head assembly connected to the platform and comprising:
  - a nozzle fluid passage comprising a nozzle fluid inlet and a nozzle fluid outlet;
  - a nozzle center air passage comprising a nozzle center air inlet and a nozzle center air outlet; and
  - a nozzle fan air passage comprising a nozzle fan air inlet and a nozzle fan air outlet;
  - wherein the nozzle center air inlet is fluidly connected to the manifold center air outlet, and the nozzle fan air inlet is fluidly connected to the manifold fan air outlet; and
- a spray gun converter comprising:
  - a body comprising:
    - a first end configured for insertion into the manifold fan air outlet;
    - a second end having a converter fitting configured for connection to a reservoir, and
  - a reservoir air passage extending through the body from an inlet end at the first end to an outlet end on the converter fitting at the second end, wherein the inlet end is configured to fluidically couple to the manifold fan air outlet when sealed;
  - a reservoir air control valve that opens and closes the reservoir air passage; and
  - a fan air control valve, comprising:
    - a threaded spindle extending through the body of the spray gun converter from the first end to the second end;
    - a valve plug attached to the threaded spindle proximate the first end of the body, wherein the valve plug is configured to engage with a portion of the manifold fan air outlet; and
    - fan air control knob attached to the spindle proximate the second end of the body.

12. The spray gun of claim 11, wherein the reservoir air control valve is a threaded needle valve comprising a reservoir air control knob.

13. The spray gun of claim 11, wherein the intersection is at substantially right angles.

14. The spray gun of claim 11, wherein the reservoir air control valve is located at the intersection of the first portion and second portion of the reservoir air passage.

15. The spray gun of claim 11, wherein the second portion of the reservoir air passage extends linearly though the body from the outlet end to an opening in the body opposite the outlet end, wherein the reservoir air control valve is threaded into the opening, and wherein the reservoir air control valve can be adjusted to close, partially open or completely open the reservoir air passage.

16. The spray gun of claim 11, further comprising a fan air control valve that opens and closes the manifold fan air outlet.

17. The spray gun of claim 16, wherein the reservoir air control valve is positioned to close the reservoir air passage and the fan air control valve is positioned to at least partially open the manifold fan air outlet.

18. The spray gun of claim 16, wherein the reservoir air control valve is positioned to at least partially open the reservoir air passage and the fan air control valve is positioned to close the manifold fan air outlet.

19. The spray gun of claim 16, wherein the reservoir air control valve is positioned to close the reservoir air passage and the fan air control valve is positioned to close the manifold fan air outlet.

20. The spray gun of claim 16, wherein the reservoir air control valve is positioned to at least partially open the reservoir air passage and the fan air control valve is positioned to at least partially open the manifold fan air outlet.

21. A method for converting a gravity-fed spray gun to a pressure- assisted spray gun, the method comprising:
- inserting a spray gun converter into a manifold of the gravity-fed spray gun, the spray gun converter comprising:
  - a body comprising:
    - a first end configured for insertion into a manifold of a spray gun, wherein the manifold comprises a manifold fan air outlet;
    - a second end having a converter fitting configured for connection to a reservoir, and
  - a reservoir air passage extending through the body from an inlet end at the first end to an outlet end on the converter fitting at the second end, wherein the inlet end is configured to fluidically couple to the manifold when assembled;
  - a reservoir air control valve that opens and closes the reservoir air passage; and
  - a fan air control valve, comprising:
    - a threaded spindle extending through the body of the spray gun converter from the first end to the second end;
    - a valve plug attached to the threaded spindle proximate the first end of the body, wherein the valve plug is configured to engage with a portion of the manifold fan air outlet; and
    - a fan air control knob attached to the spindle proximate the second end of the body.

* * * * *